Sept. 12, 1933.                H. W. SHELDON                 1,926,116
                              DISTILLING APPARATUS
                              Filed Jan. 28, 1931
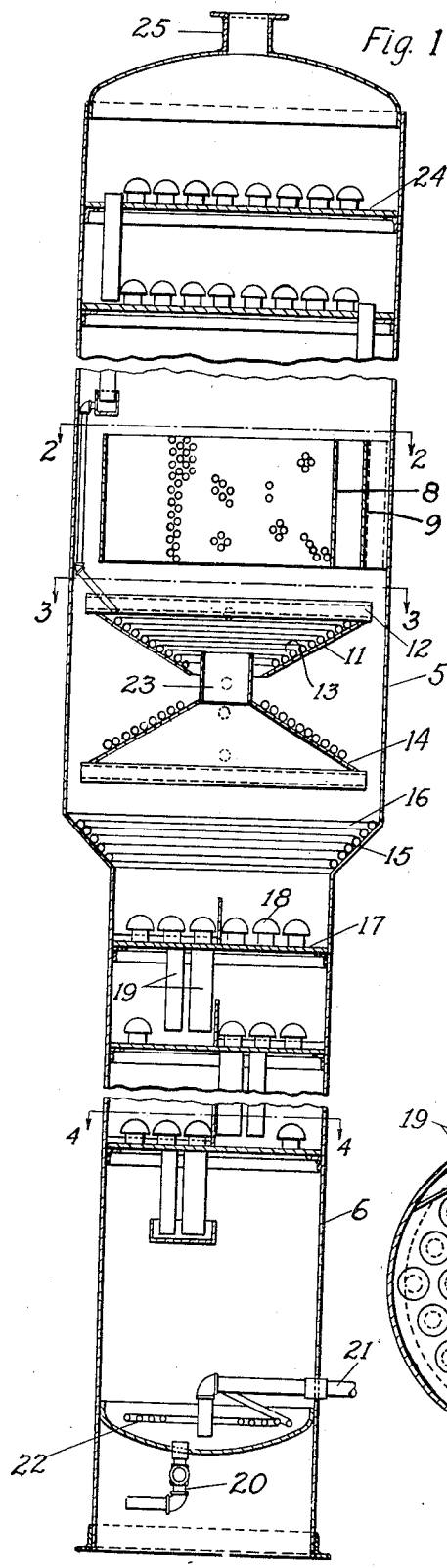
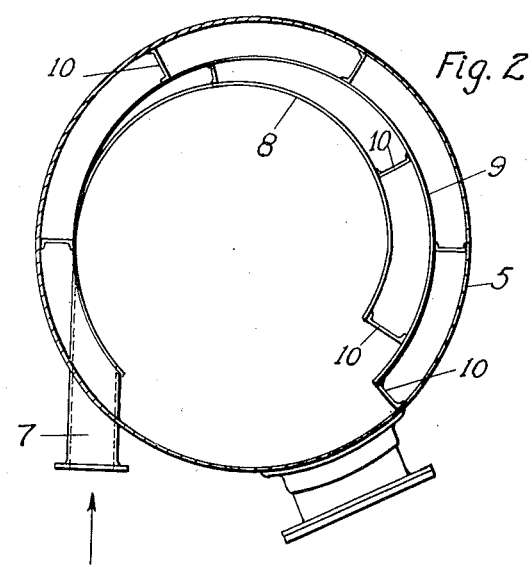
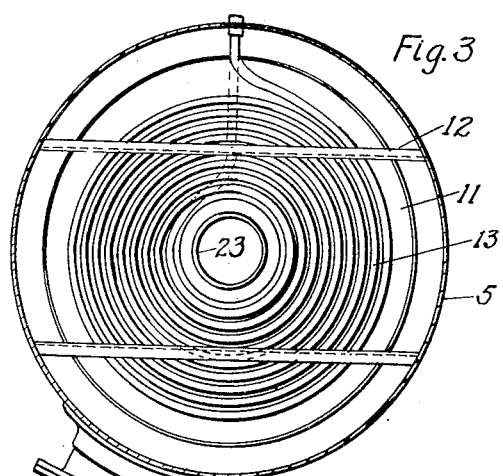
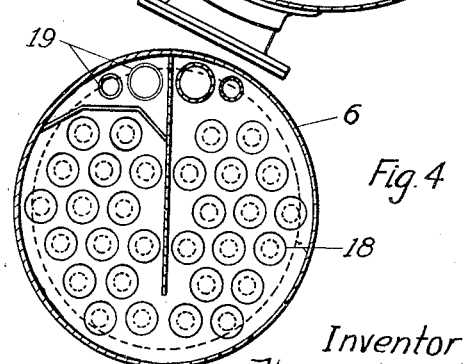
Inventor
Howard W. Sheldon
by his attorney
Furnum F. Dorsey Patented Sept. 12, 1933

1,926,116

UNITED STATES PATENT OFFICE 1,926,116

DISTILLING APPARATUS

Howard W. Sheldon, East Orange, N. J., assignor, by mesne assignments, to Vacuum Oil Company, Inc., New York, N. Y., a corporation of New York Application January 28, 1931. Serial No. 511,674

1 Claim. (Cl. 196—128)

This invention relates to apparatus for separating, by distillation, two liquids having a pronounced difference in boiling point, and it is particularly adapted for use in petroleum manufacture, for separating solvent naphtha or gasoline from lubricating oil which has been diluted with the naphtha or gasoline for the purpose of filtration or of dewaxing the oil.

The object of the invention is to produce an apparatus capable of handling a large quantity of oil and of thoroughly separating the diluent therefrom with a minimum expenditure of heat. To this end the invention consists in the distilling device or apparatus hereinafter described in and illustrated in the accompanying drawing, as it is defined in the appended claim.

In the drawing, Fig. 1 is a central vertical section of a still embodying the present invention, and Figs. 2, 3 and 4 are horizontal sections, respectively on the lines 2—2, 3—3 and 4—4 in Fig. 1, on a slightly larger scale than the latter figure.

The illustrated embodiment of the invention comprises a vertical housing of generally cylindrical form. This housing has a relatively wide upper portion 5 and a narrower lower portion 6. The liquid to be distilled is introduced into an intermediate part of the upper portion 5 through a tangentially arranged inlet pipe 7, as shown in Fig. 2. The liquid is preferably somewhat preheated in any convenient way, as, for example, by the usual heat exchangers (not shown). From the pipe 7 it is discharged against a curved plate 8, which is perforated as suggested in Fig. 1. Outside of the plate 8 and concentric with the housing 5 is an imperforate plate 9, the two plates being maintained in position by vertical webs 10, as shown in Fig. 2. The effect of the plate 8 is to permit the liquid to be discharged in numerous small streams against the plate 9, thus producing a film or sheet which falls along the surface of the plate 9. At this point any vapors which have already been evolved in preheating may separate readily from the liquid and rise between the plates 8 and 9.

From the lower edge of the plate 9 the film of liquid is discharged upon a conical baffle 11. This baffle is of somewhat less diameter than the housing, and is supported by two cross bars 12. The upper surface of the baffle 11 is covered by the coils of a steam pipe 13, and these coils constitute a series of weirs over which the liquid trickles in passing downwardly by gravity to the central opening of the baffle. Through this opening the liquid then discharges upon a second conical baffle 14, which is arranged in reverse position with respect to the baffle 11 and is also provided with steam coils. From the lower and outer edge of the baffle 14 the liquid falls to a third conical surface 15 which constitutes a part of the housing, and which also is covered with steam coils 16.

In passing over the baffles and the steam coils the liquid is quickly and thoroughly heated, so that nearly all of the lighter constituent is boiled out of the liquid. Complete separation is essential, however, and means are therefore provided in the lower part of the housing for stripping the oil of any small remnant of diluent. These means comprise a rectifying section consisting of a series of plates 17, with bubble caps 18 and overflow pipes 19, and a steam pipe 21 which is arranged to discharge steam into the lower end of the housing, and also to feed a coil 22 for indirect heating. The oil is drawn off as required through an outlet pipe 20, but a body of oil is maintained into which the steam is discharged to wash out the remaining diluent. The mingled vapor and steam ascend through the rectifying section, in which any oil-mist or vapor which may be entrained is collected and returned to the bottom of the housing. The rectified vapor and the steam then pass upwardly through the vaporizing section, and this passage is facilitated by making the conical baffles of less diameter than the housing, so as to provide free annular vapor passages adjacent the walls of the housing. The baffle 14 is also provided, at the middle, with a vapor neck 23 through which vapors may pass at the middle of the apparatus.

In order to arrest any oil-mist which might otherwise be carried up by the large volume of vapors, a series of bubble plates 24 are located in the uppermost part of the housing, these plates being of conventional construction and provided with the usual bubble caps and overflow pipes. The clean vapors are finally discharged through an outlet 25 at the top of the housing, from which they may be conducted to the usual condensing apparatus.

The invention claimed is:

In distilling apparatus, the combination of a housing, inclined baffles, within the housing, arranged to discharge liquid from one to another while it descends by gravity, and steam pipes lying on the upper surfaces of the baffles and forming parallel weirs over which the liquid flows in descending the baffles.

HOWARD W. SHELDON.